(12) United States Patent
Modglin et al.

(10) Patent No.: US 6,487,845 B1
(45) Date of Patent: Dec. 3, 2002

(54) PIVOT FAIRING THRUST REVERSER

(75) Inventors: Rodger L. Modglin, Cleveland, OK (US); Frederick H. Peters, Tulsa, OK (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 09/877,826

(22) Filed: Jun. 8, 2001

(51) Int. Cl.[7] ................................................. F02K 3/02
(52) U.S. Cl. ............... 60/226.2; 244/110 B; 239/265.29
(58) Field of Search ................................. 60/226.2, 230; 244/110 B; 239/265.19, 265.29

(56) References Cited

U.S. PATENT DOCUMENTS

| | | |
|---|---|---|
| 2,680,948 A | 6/1954 | Greene |
| 2,847,823 A | 8/1958 | Brewer |
| 3,492,821 A * | 2/1970 | Monaghan et al. ............ 60/229 |
| 4,182,501 A | 1/1980 | Fage |
| 4,422,605 A | 12/1983 | Fage |
| 5,785,249 A * | 7/1998 | Metezeau et al. ...... 239/265.19 |
| 5,794,433 A * | 8/1998 | Peters et al. ........... 239/265.29 |
| 5,819,527 A | 10/1998 | Fournier |

FOREIGN PATENT DOCUMENTS

| | | |
|---|---|---|
| FR | 2601077 | 1/1988 |
| FR | 2696212 | 4/1994 |

* cited by examiner

*Primary Examiner*—Ehud Gartenberg
(74) *Attorney, Agent, or Firm*—Francis L. Conte

(57) ABSTRACT

A thrust reverser includes a pair of doors covering corresponding portals in an exhaust duct between an inlet and outlet nozzle at opposite ends thereof. The duct also includes a pair of side beams having actuators mounted thereon, and operatively joined to the doors for selective rotation thereof about corresponding pivots. Blister fairings are disposed inside the duct and sealingly join the doors to the beams around respective ones of the pivots.

27 Claims, 4 Drawing Sheets

PIVOT FAIRING THRUST REVERSER

BACKGROUND OF THE INVENTION

The present invention relates generally to aircraft engines, and, more specifically, to thrust reversers therefor.

Turbofan gas turbine engines are commonly used for powering aircraft in flight. In a turbofan engine, air is pressurized in a compressor and mixed with fuel and ignited in a combustor for generating hot combustion gases which flow downstream through turbines which extract energy therefrom. A high pressure turbine powers the compressor, and a low pressure turbine powers the fan disposed upstream of the compressor.

Propulsion thrust is provided by the combination of the hot combustion gas exhaust from the core engine with the pressurized fan air which bypasses the core engine. In a long duct turbofan engine, the fan air bypasses the core engine inside a surrounding nacelle and is mixed with the core exhaust prior to discharge from the engine in a combined exhaust stream.

During aircraft landing, it is common to employ thrust reversers with the engine in which doors are selectively opened for blocking the aft direction of the engine exhaust and redirecting it in the forward direction for providing additional braking for the aircraft. There are two basic types of thrust reversers having doors mounted either post-exit to the discharge exhaust nozzle, or preexit from that outlet nozzle.

Since thrust reversers are used solely during aircraft landing they must be integrated into the engine with minimal adverse effect during all remaining conditions of operation including takeoff, cruise, and descent. However, in view of the attendant complexity in providing thrust reversers at the discharge end of the engine, the prior art is quite crowded with myriad forms of thrust reversers attempting to minimize adverse affects thereof while maximizing aerodynamic performance of the engine.

Since an aircraft engine is specifically configured for powering an aircraft in flight, engine weight is a primary design factor, and the introduction of a thrust reverser should minimize the corresponding increase in engine weight. Propulsion efficiency of the engine is yet another significant design factor, which is also adversely affected by the introduction of thrust reversers in various forms.

For example, a post-exit thrust reverser includes a pair of clamshell doors which are deployed in the form of an open clamshell for redirecting the engine exhaust in the forward direction during landing. Since the deployed clamshell doors must closely adjoin each other at their trailing edges, when the doors are retracted or stowed, the trailing edges thereof typically form a fishmouth configuration which introduces undesirable aerodynamic drag during normal operation of the engine. Drag is a performance penalty which reduces overall efficiency of the engine with this type of thrust reverser.

In pre-exit type thrust reversers, the reverser doors are located upstream from the discharge end of the nozzle resulting in a typically more complex configuration for integrating the doors in the stowed and deployed positions thereof. In particular, the stowed doors must minimize aerodynamic losses of the exhaust channelled therethrough during normal operation, as well as providing a streamlined outer surface for reducing drag thereover. And, the doors should be suitably sealed to the exhaust nozzle when stowed for reducing or minimizing exhaust gas leakage through the convoluted perimeter of the doors.

Since the exhaust nozzle is annular in configuration, each of the two doors must be suitably arcuate to match the annular configuration of the nozzle when stowed. The two doors are thusly arcuate at their forward and aft ends with relatively straight side edges therebetween, and with inner and outer surfaces which must suitably blend with corresponding inner and outer surfaces of the exhaust duct in which they are mounted.

Adding to the complexity of thrust reverser design is the inherent necessity for suitable actuation thereof for deploying open the doors when required and retracting closed the doors to their stowed positions when not required for aircraft landing. Various forms of actuators are found in the prior art having different advantages and disadvantages, which also increase the complexity of effective sealing of the doors.

Yet another significant design factor for thrust reversers is the integration with the actuating means of suitable safety devices for preventing unintended deployment of the thrust reversers except for aircraft landing. Such deployment prevention must be integrated with the actuating means without introducing excessive weight penalty, yet providing a durable and rugged thrust reverser actuation system for long life thereof.

Accordingly, it is desired to provide an improved thrust reverser with integrated components for enhancing aerodynamic performance in a compact and rugged assembly.

BRIEF SUMMARY OF THE INVENTION

A thrust reverser includes a pair of doors covering corresponding portals in an exhaust duct between an inlet and outlet nozzle at opposite ends thereof. The duct also includes a pair of side beams having actuators mounted thereon, and operatively joined to the doors for selective rotation thereof about corresponding pivots. Blister fairings are disposed inside the duct and sealingly join the doors to the beams around respective ones of the pivots.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
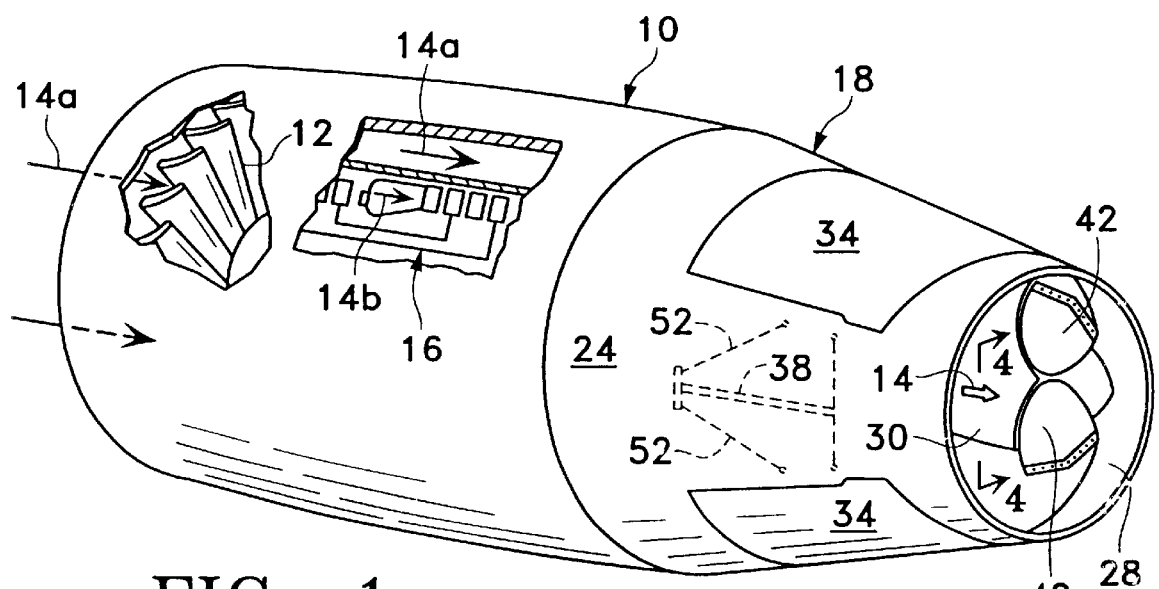
FIG. 1 is isometric view of an exemplary turbofan gas turbine aircraft engine having a thrust reverser mounted at the aft end thereof in accordance with the present invention.

Illustrated in FIG. 1 is a gas turbine engine 10 in the exemplary form of a turbofan engine configured for powering an aircraft in flight. In this exemplary embodiment the engine is configured for being side-mounted to the fuselage of an aircraft near the tail thereof.

The engine may have any conventional configuration and typically includes a single stage fan 12 having rotor blades through which ambient air 14a enters the engine during operation. The fan is powered by a core engine 16 having a compressor that pressurizes a portion of the fan air which is then mixed with fuel and ignited in a combustor for generating hot combustion gases 14b which are discharged through corresponding high and low pressure turbines disposed downstream therefrom. The high pressure turbine powers the compressor through a shaft therebetween, and the low pressure turbine powers the fan through another shaft therebetween.

The fan air bypasses the core engine inside a corresponding bypass duct defined between the outer nacelle of the engine and the outer casing of the core engine and mixes with the combustion gases at the aft end of the engine prior to discharge as a common exhaust stream 14 through an annular thrust reverser 18 mounted to the aft end of the engine. But for the thrust reverser 18, the engine may have any conventional configuration and is operated in a conventional manner for powering an aircraft from takeoff, cruise, descent, and landing.

Accordingly, the thrust reverser 18 is provided for use only during landing of the aircraft for providing braking reverse thrust for assisting and stopping the aircraft along the runway.

Figure 2:
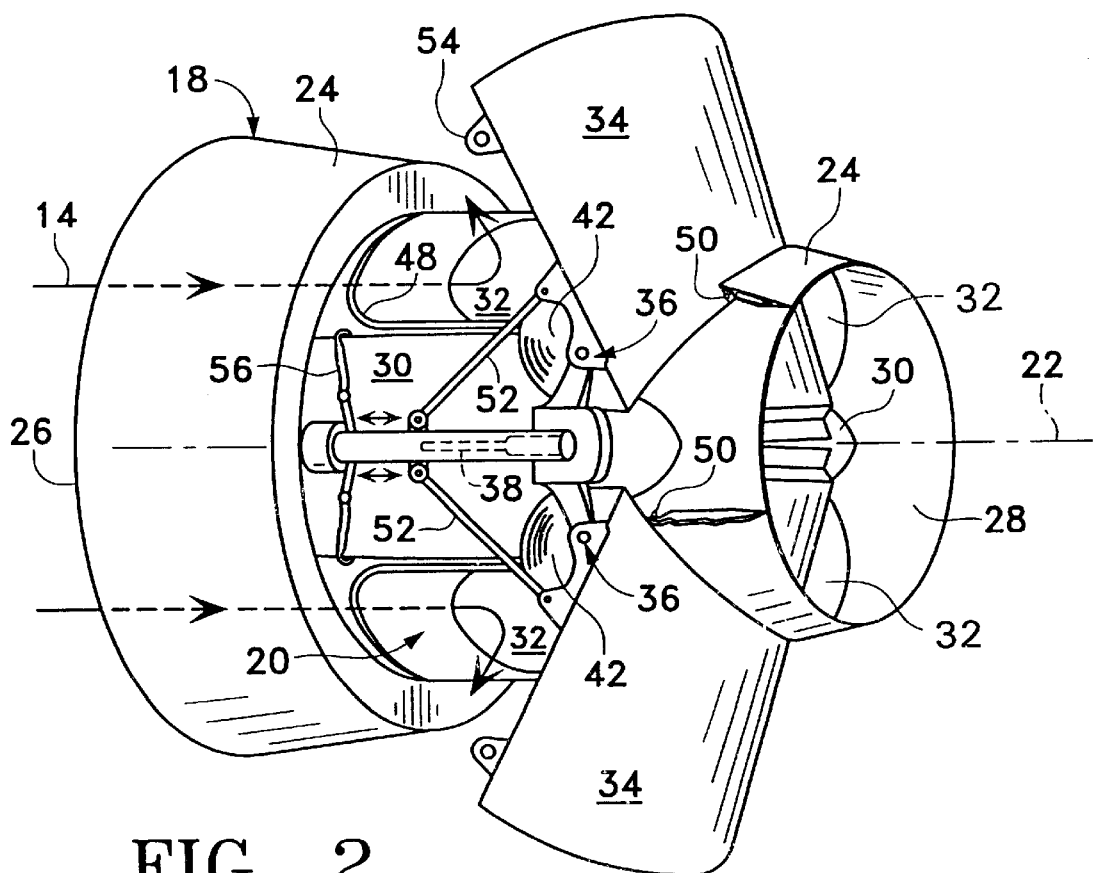
FIG. 2 is isometric view of the thrust reverser illustrated in FIG. 1 with doors thereof being deployed open in accordance with an exemplary embodiment of the present invention.

The thrust reverser 18 in accordance with an exemplary embodiment of the present invention is illustrated closed in FIG. 1 and opened in FIG. 2 in isolation from the engine. As initially shown in FIG. 2, the thrust reverser includes a generally annular exhaust duct 20 having an axial centerline axis 22 therethrough. The exhaust duct defines the outer boundary for discharging the fan and gas streams in the common exhaust stream 14, and is surrounded by a suitable external fairing 24 which blends smoothly with the external surface of the engine nacelle for reducing friction drag thereover during operation.

The exhaust duct 20 includes an inlet 26 at the upstream end thereof for receiving the exhaust 14 from the engine. An annular outlet or discharge nozzle 28 is disposed at the opposite, axially downstream end of the exhaust duct for discharging the exhaust therefrom during normal operation of the engine for forward propulsion in flight.

As shown in FIGS. 1 and 2, the exhaust duct also includes a pair of diametrically opposite side beams 30 extending axially between the inlet and nozzle ends of the duct on the horizontal left and right sides thereof.

A pair of diametrically opposite side outlets or portals 32 are disposed circumferentially between the side beams and spaced forward from the outlet nozzle 28. The two portals are disposed in the top and bottom sides of the exhaust duct and extend in an arc between the two side beams for providing upper and lower side outlets for the exhaust flow during operation of the thrust reverser.

Thrust reversing operation is effected by a pair of thrust reverser doors 34 disposed in respective ones of the portals, with each door having a generally arcuate shape in the typical form of clamshell thrust reverser doors. e individual doors may be formed in any conventional manner including inner and outer skins with reinforcing ribs therebetween. And, the exhaust duct 20 may also be configured in any conventional form with a smooth inner skin bounding the exhaust during operation, and surrounded by the external fairing 24 which preferably has removable panels for accessing internal features of the thrust reverser.

Figure 3:
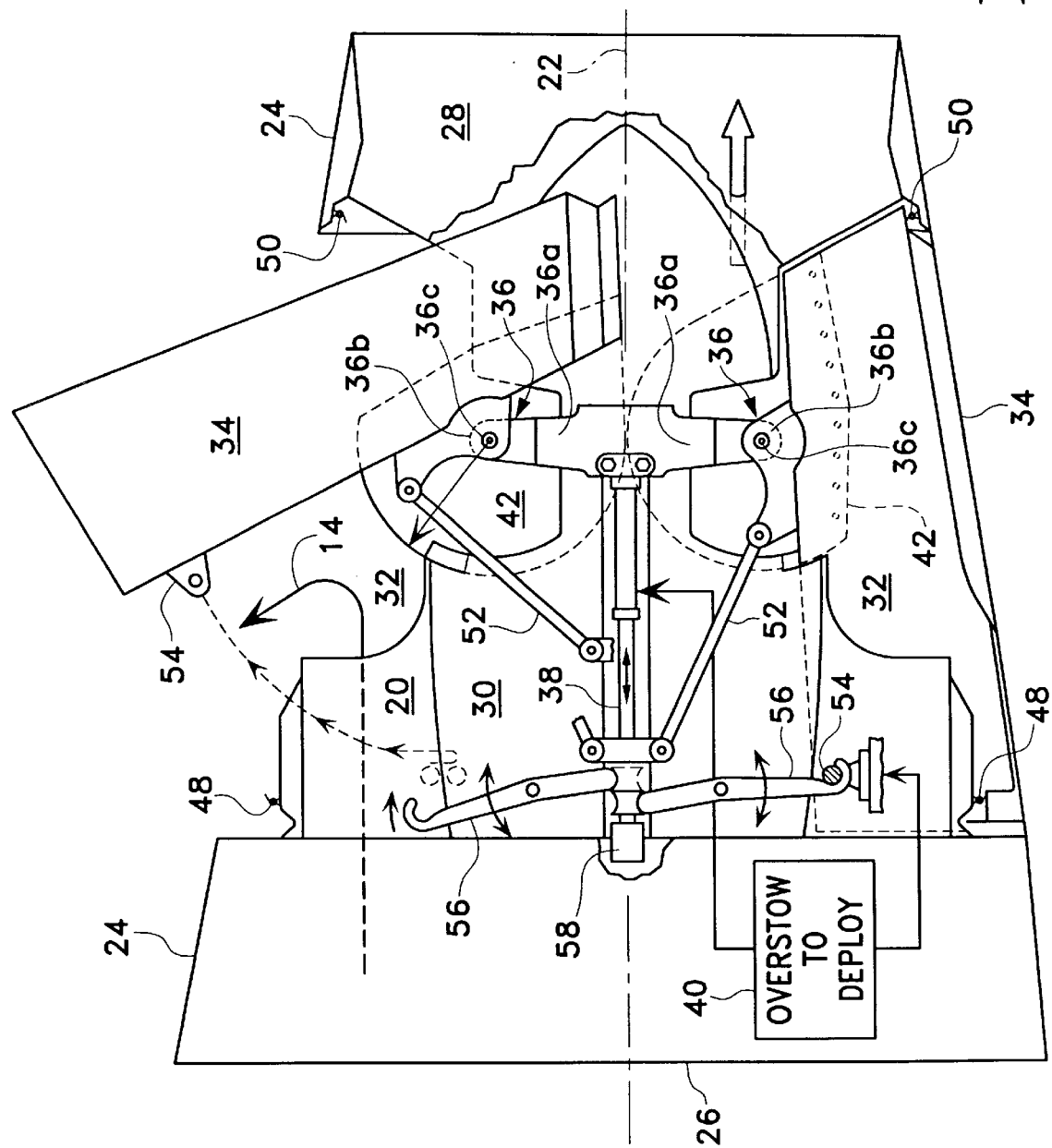
FIG. 3 is a partly sectional, side elevational view of the thrust reverser illustrated in FIG. 2 with the upper door being deployed open and the lower door being illustrated retracted closed in its stowed position for direct comparison.

As shown in FIGS. 2 and 3, each of the two doors 34 is rotatably mounted at opposite circumferential sides thereof to the two side beams by corresponding pivots 36. Each door thusly includes two pivots disposed on the sides thereof upstream from the trailing edge of the door, which define a single pivot axis for swinging open or closed the individual doors in their respective portals.

As shown in FIG. 3, each of the pivots 36 is in the preferred form of an inner support arm 36a fixedly joined to a respective side beam by suitable fasteners for example, and extending vertically upwardly or downwardly in the form of a cantilever therefrom. Each pivot also includes an outer support arm 36b fixedly joined to a respective door on opposite sides thereof and spaced upstream from the trailing edge of the door. A fastener 36c pivotally joins together the respective pairs of inner and outer arms in any conventional manner for permitting each door to pivot open and close around a corresponding single pivot axis thereof.

As shown in FIGS. 2 and 3, means are provided for actuating the doors for selectively deploying open and retracting closed the doors around the corresponding pivots. In the preferred embodiment illustrated the actuating means include a pair of side actuators 38 fixedly mounted on respective ones of the two side beams and operatively joined to the doors for selective rotation thereof about the pivots to deploy the doors during thrust reverser operation and stow the doors for all other normal operation of the engine when thrust reverse is not required.

As shown schematically in FIG. 3, the actuators are operatively joined to a suitable controller 40 configured for controlling all operation of the thrust reverser as required. For example, the actuators 38 may be hydraulically powered, and the controller 40 is configured for extending or retracting the output rods of the actuators for pivoting open or closed the doors as desired.

As shown in FIG. 1 and in the bottom half of FIG. 3, each door 34 closes the corresponding portal 32 when stowed, with the external surface thereof blending smoothly with the external fairing of the thrust reverser. Since the thrust reverser is annular, the two doors are arcuate in the circumferential direction over the required extent to close the portals. The doors preferably have upstream edges which overlap corresponding upstream portions of the duct in front of the portals, and downstream portions which underlap upstream edges of the outlet nozzle 28 at the aft end of the corresponding portals.

As shown in FIG. 2 and in the upper half of FIG. 3, the individual doors are rotated around the respective pivots 36 during deployment for opening the forward portions of the portals and redirecting the exhaust 14 radially outwardly therefrom in the general forward direction during thrust reverse operation. The aft ends of the doors are correspondingly pivoted together inside the exhaust nozzle wherein they adjoin each other as illustrated in FIG. 2 to form the typical clamshell configuration with an obtuse included angle therebetween for discharging the exhaust out the upper and lower portals during thrust reverse operation. The doors may abut each other when open, or may have a small gap therebetween in accordance with conventional deployment practice.

Single-pivot clamshell thrust reverser doors, like those illustrated in FIG. 3, are particularly difficult to seal at the corresponding pivots due to the rotary movement of the doors within the corresponding portals.

However, and in accordance with the present invention, two pairs of blister fairings 42 as initially shown in FIGS. 1–3 are disposed inside the exhaust duct and sealingly join the doors to the side beams around respective ones of the four pivots 36. The blister fairings 42 provide means for covering the four pivots inside the exhaust duct for sealing closed each of the doors at each of the pivots notwithstanding the rotary motion of each door required for deployment and retraction. Sealing of the pivot joints is particularly important when the doors are stowed for reducing or preventing leakage of the exhaust flow therethrough which would decrease the propulsion efficiency of the exhaust discharged through the exhaust nozzle.

Figure 4:
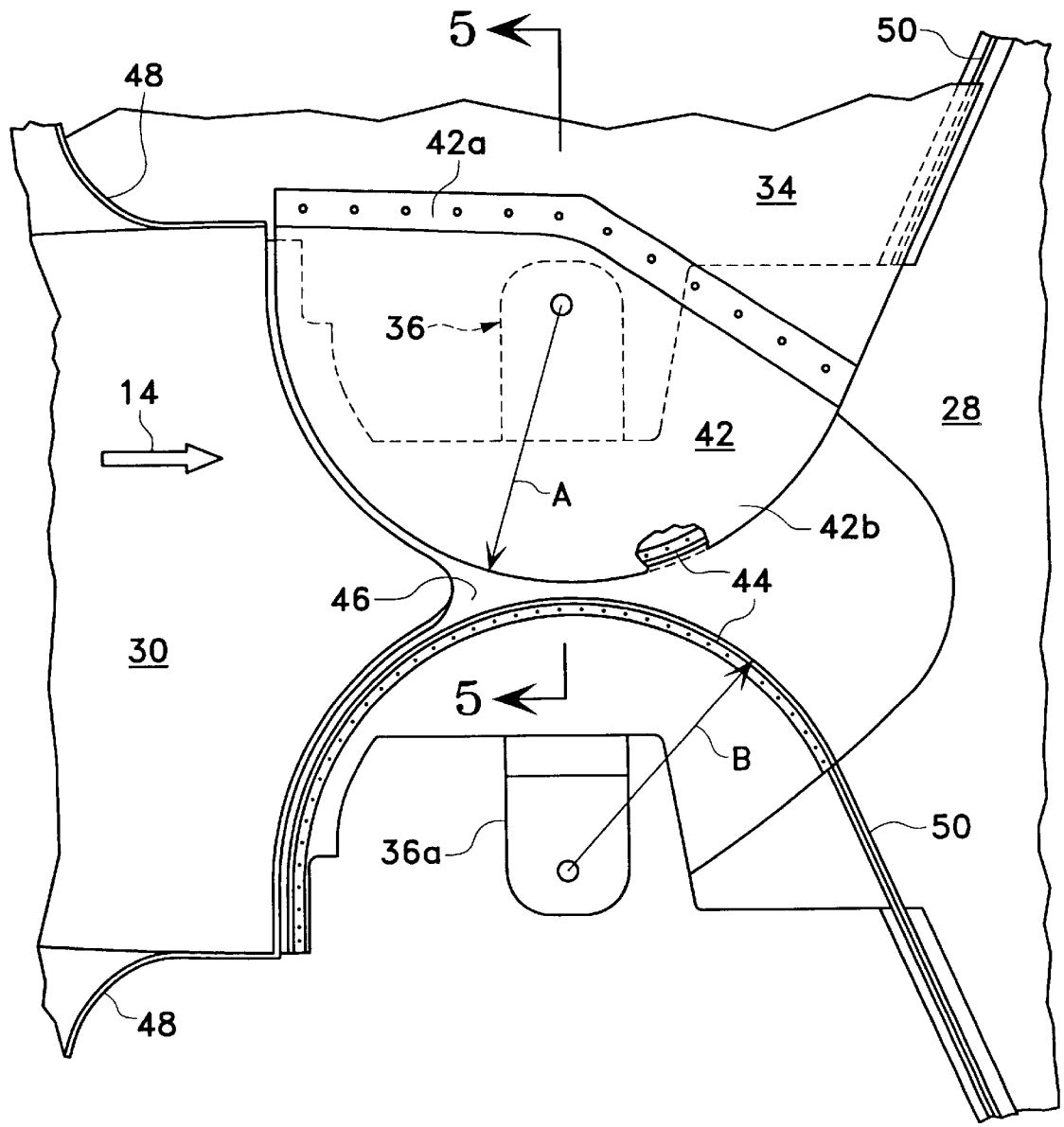
FIG. 4 is a partly sectional, side elevational view of two door pivots and covering blister fairings in accordance with an exemplary embodiment as viewed generally along line 4—4 inside the exhaust duct illustrated in FIG. 1.

As best illustrated in FIG. 4, each of the blister fairings 42 includes a proximal border 42a fixedly and sealingly joined to the inside of a respective door outboard of the pivot 36. And, each fairing includes an arcuate opposite distal border 42b which is cantilevered away from the door edge and overlaps a respective side beam along the inner surface thereof. The distal border 42b forms a portion of a circle having a radius A with a center of curvature corresponding with the respective center of the pivot 36 for rotating thereabout. In this way, as each door rotates around the pivot 36 during deployment or retraction, the attached blister fairing also rotates therewith relative to the stationary side beam 30.

Each blister fairing thusly covers the inner surface of the respective pivots and provides an aerodynamically smooth flowpath along which the exhaust 14 is discharged during operation. In the preferred embodiment illustrated in FIGS. 4 and 5, an arcuate fairing seal 44 is fixedly mounted to the inner surface of the side beams around each of the four pivots in sliding sealing abutment with the arcuate distal borders 42b of corresponding ones of the blister fairings for providing four corresponding rotary seals therewith. The fairing seals 44 have a radius of curvature B measured from the center of the respective pivots 36, which seal radius B is slightly less than the border radius A of the fairing for providing a rotary slide seal therebetween as the doors pivot when actuated. The fairing border 42b is thusly concentric with the arcuate fairing seal 44 for maintaining continuity of the seal therebetween.

Figure 5:
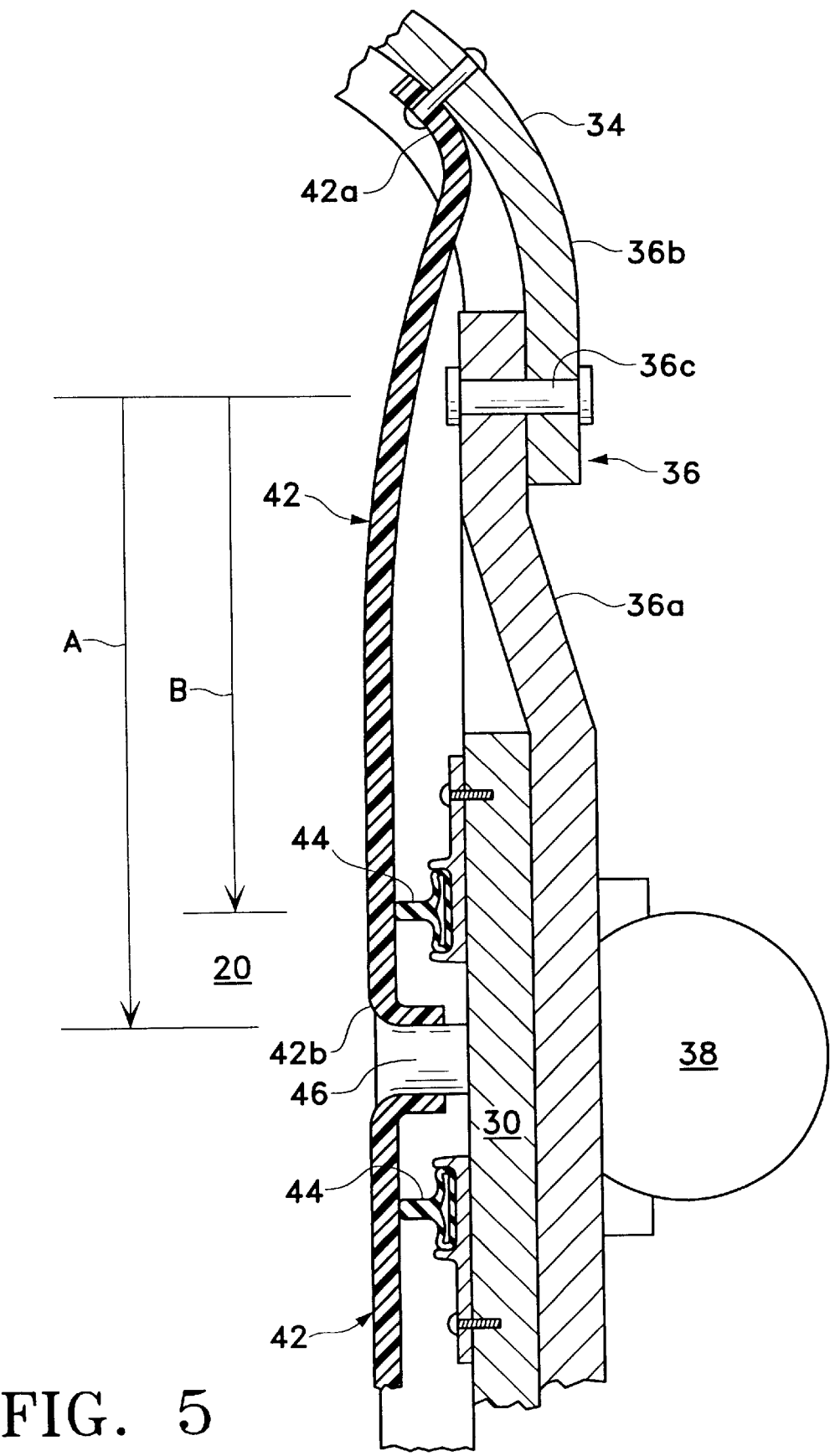
FIG. 5 is an elevational sectional view through the door pivot and blister fairing illustrated in FIG. 4 and taken along line 5—5.

As shown in FIG. 5, each fairing seal may have any suitable form for providing a sliding seal between the blister fairing and the inner surface of the side beam 30. For example, each fairing seal may be formed of a suitable elastomeric material such as silicone covered with a low friction fabric such as polytetrafluoroethylene (PTFE), commonly known as Teflon, which seal materials are common in thrust reversers. The seal is suitably trapped or secured in a metal supporting strip which is suitably fixedly joined to the side beam by fasteners or rivets for example.

As initially illustrated in FIG. 1, the inner surface of the exhaust duct is generally circular except at the side beams 30 which are generally flat for mounting the actuators to the external surfaces thereof. In other embodiments, the side beams may be arcuate, and, for example, may match the inner diameter of the exhaust duct.

As shown in FIG. 4, the fairing seals 44 are preferably mounted on locally flat inner surfaces of the side beams 30 to sealingly abut the correspondingly flat inner surfaces of the fairing distal borders 42b. In this way, when the doors are stowed in their closed positions, the distal borders of each of the blister fairings sealingly engages the corresponding fairing seals 44 to reduce or eliminate any exhaust flow leakage therethrough for normal operation of the engine.

In another embodiment of the sealed joints, the fairing distal borders may match the fairing seals in an arcuate abutting fit, like a spherical joint, for providing a contact seal therebetween which permits relative movement between the fairing and seal during door deployment.

Accordingly, the exhaust 14 is confined to flow out the discharge nozzle 28 for maximum propulsion efficiency and with little if any leakage around the four pivot joints of the closed doors. However, when the doors are deployed to their open position, the sliding joint formed between the fairing borders and the fairing seals permit relative movement therebetween without obstruction between the blister fairings and the side beams. And, the fairing seals additionally seal against exhaust flow leakage around the pivot joints during thrust reverse operation for maximizing efficiency thereof.

As shown in FIGS. 4 and 5, the side beams 30 preferably include corresponding steps or recesses 46 disposed forward of the respective blister fairings 42 for mounting the fairings substantially flush in the recesses, with the corresponding fairing seals 44 being recessed below the blister fairings and the flat plateau or step provided upstream of the recess. In this way as the exhaust 14 flows downstream along the flat inner surface of the side beams 30, it may smoothly flow over the inner surface of the respective blister fairings 42 disposed substantially flush therewith. The blister fairings thusly do not create upstream facing steps which would increase drag losses in the exhaust being discharged through the exhaust duct.

As shown in FIGS. 2 and 3, each of the doors 34 includes a forward perimeter disposed forward of the two blister fairings at the corresponding pivots 36 thereof. The door forward perimeter is arcuate along the leading edge of the door and generally straight along the two side edges of the door extending aft to the two pivots. The inside or inner surface of the forward door perimeter matches the corresponding configuration of the outer surface of the exhaust duct 20 around the forward portion of the corresponding portals.

Fixedly mounted to the outer surface of the exhaust duct is a cooperating forward seal 48 surrounding each of the portals 32 forward of the respective blister fairings 42 for abutting and sealing the door forward perimeter when stowed in the closed position as illustrated in the bottom half of FIG. 3.

Correspondingly, each door includes an aft perimeter disposed aft of the two blister fairings thereof, which is arcuate along the trailing edge of each door and generally straight along the two side edges of each door forward to the corresponding pivots. The outer surface of the door aft perimeter is suitably configured for underlapping the corresponding inner surface of the outlet nozzle 28 at the aft end of each portal. The duct preferably also includes an aft seal 50 surrounding each of the portals aft of the blister fairings and within the inner edge of the external fairing. In this way, when the doors are stowed closed as illustrated in the bottom half of FIG. 3, the aft perimeter of each door sealingly engages the aft seal 50 at the upstream end of the exhaust nozzle.

The forward and aft seals 48,50 are preferably continuous strips having any suitable seal configuration such as conventional silicone wipers or leaf seals encased by a fabric of low friction material like PTFE.

As shown in FIGS. 2 and 4, the forward seal 48 surrounds the forward portion of each portal up to the forward end of each blister fairing, and the aft seal 50 surrounds the aft portion of each portal up to the aft end of each blister fairing, and the forward and aft seals preferably adjoin opposite ends of the respective fairing seals 44 to provide substantially full-perimeter sealing of each of the doors when stowed closed. Each blister fairing covers the inner surface of each pivot joint and provides the arcuate border for maintaining continuity of the door seal between the forward and aft seals 48,50. Each door is thusly fully sealed when closed, yet may be pivoted open without compromising performance of the blister fairings 42 and the cooperating fairing seals 44.

In the preferred embodiment illustrated in FIGS. 2 and 3, the door actuating means preferably also include two pairs of actuator rods or links 52 pivotally joined at opposite ends to respective ones of the two doors 34 forward of the corresponding pivots thereof, and to the two side actuators 38 for selectively rotating open and closed the doors around the corresponding pivots. As shown in FIG. 3, each actuator link 52 is pivotally joined to a corresponding support arm extending from the side of the door in an integral assembly with the outer arm 36b. And, each blister fairing 42 is sized and configured to additionally cover corresponding ends of the links joined to the door.

In this way, each of the two doors 34 is joined at opposite sides thereof to respective ones of the two actuators 38 by the corresponding two actuator links 52. As the actuator output rod is retracted or extended, the proximal ends of the four links 52 travel therewith for pivoting open or closed the respective doors around the corresponding pivots 36. In FIG. 3, the upper door 34 is illustrated deployed with the corresponding actuator link 52 being pushed outwardly, and the inner door 34 is illustrated stowed with the corresponding actuator link 52 being withdrawn inwardly.

The kinematic motion of the actuator, cooperating links, and singlepivot doors may be derived from that disclosed in substantial detail in U.S. Pat. No. 4,422,605-Fage, incorporated herein by reference. This actuation system has several advantages including effective deployment of the two doors, and safe locking thereof in their stowed positions. For example, the two doors are interconnected to each other by the four actuator links 52 and the two common actuators 38. This provides redundancy in both deploying the doors as well as maintaining the doors safely stowed in their closed positions.

Additional redundancy in locking closed the two doors in the stowed position is provided by additional means specifically configured for selectively latching closed the two doors, and unlatching the doors only after the doors are overstowed or superetracted. For example, each of the doors 34 as illustrated in FIG. 3 may include a pair of outer hooks 54 fixedly mounted to the forward ends thereof at the circumferentially opposite sides. And, a pair of inner hooks or latches 56 are pivotally mounted to each of the two side beams 30 for selectively latching respective ones of the outer hooks 54 to prevent deployment of the doors when not intended.

The two inner latches 56 are suitably joined to a latch actuator 58, which is preferably hydraulically driven, for pivoting the latches either clockwise or counterclockwise when desired. In the top of FIG. 3, the inner latch 56 has been rotated counterclockwise for releasing the corresponding outer hook 54 to deploy the corresponding door.

And, the inner latch 56 in the bottom half of FIG. 3 has been rotated counterclockwise to engage the corresponding outer hook 54 and lock closed the corresponding door 34 in its stowed position. The two deployed and stowed positions are illustrated together in FIG. 3 for clarity of presentation, with it being understood that the two doors are either deployed open or stowed closed together in normal operation.

A particular advantage of the latching means illustrated in FIG. 3 is that the two latches 56 prevent deployment of the doors from the stowed position unless the two doors are firstly superetracted or overstowed by operation of the corresponding door actuators 38 prior to reversing those door actuators to deploy the doors. Since the inner latches 56 have a general J-configuration, they cannot be disconnected from the cooperating outer hooks until those outer hooks are driven inwardly toward the center of the exhaust nozzle for permitting the J-latches to clear the outer hooks. Accordingly, the controller 40 is configured for initially driving the door actuators 38 to superetract the doors from their closed and stowed positions for permitting unlatching of the inner latches 56 prior to reversing direction of the door actuators to deploy the doors.

This overstow feature is also described in substantial detail in the Fage patent described above and is preferably incorporated in the preferred embodiment of the thrust reverser of the present invention.

A particular advantage of the pre-exit type of thrust reverser illustrated in FIGS. 1–3 is the optimum forward thrust performance thereof attributable to the downstream located exhaust nozzle 28. As shown in FIG. 3, the trailing edge of the exhaust nozzle 28 is coplanar and substantially normal to the centerline axis 22 for substantially reducing aerodynamic losses or base drag during operation, which losses and drag are typically found in conventional fishmouth exhaust outlets.

Furthermore, the exhaust nozzle 28 is preferably circular at its trailing edge as illustrated in FIGS. 1 and 2 for maximizing propulsion efficiency, and blends forward therefrom with the flat inner surfaces of the two side beams 30 as best illustrated in FIGS. 1 and 4. The two side beams 30 are preferably flat for mounting the common actuators 38 and the cooperating actuator links 52 as illustrated in FIG. 3 and thusly interrupt the circular continuity inside the exhaust duct. However, the inner surfaces of the flat side beams may blend at both their upstream and downstream ends to smoothly transition to the fully circular inner surface of the exhaust duct at the opposite inlet and outlet ends thereof.

As best illustrated in FIG. 5, each of the blister fairings 42 blends from the flat inner surfaces of the side beams to the arcuate inner surface of the respective doors 34 at the proximal borders 42a of the individual fairings. Each of the blister fairings 42 is preferably sized and configured to cover respective ones of the door pivots 36 for providing effective seals therearound, with forward and aft continuity with the forward and aft seals 48,50.

The blister fairings may have a suitable dome configuration for covering the inside of the door joints, and may be made of any suitable material such as metal, or preferably lightweight graphite and epoxy composite. The exposed inner surface of each blister fairing should aerodynamically blend with the inner surfaces of the respective doors and side beams for providing an aerodynamically smooth boundary for discharging the exhaust through the outlet duct.

The improved thrust reverser described above has enhanced forward thrust performance due to the blister fairings, low base drag, and the safety of the single-pivot side actuation and overstow feature. The single-pivot side actuation of the two doors has proven experience in the field for durable and rugged operation. And, the blister fairings effectively seal the door pivots for maximizing performance and efficiency.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. An aircraft engine thrust reverser comprising:

an exhaust duct having an inlet at one of end for receiving exhaust from said engine, an outlet nozzle at an opposite end for discharging said exhaust, a pair of opposite side beams extending between said inlet and nozzle, and a pair of opposite portals disposed circumferentially between said beams forward of said nozzle;

a pair of thrust reverser doors disposed in respective ones of said portals, and rotatably mounted to said beams at corresponding pivots;

a pair of actuators mounted on respective ones of said beams and operatively joined to said doors for selective rotation thereof about said pivots; and two pairs of blister fairings disposed inside said duct and sealingly joining said doors to said beams around respective ones of said pivots.

2. A thrust reverser according to claim 1 wherein said fairings are fixedly joined to said doors for rotation therewith around said pivots.

3. A thrust reverser according to claim 2 wherein each of said fairings includes a proximal border fixedly joined to a respective door, and an arcuate distal border overlapping a respective beam, and having a center of curvature corresponding with a respective pivot for rotation thereabout.

4. A thrust reverser according to claim 3 further comprising an arcuate fairing seal fixedly mounted to said side beams around each of said pivots in sliding sealing abutment with said arcuate distal borders of corresponding ones of said fairings.

5. A thrust reverser according to claim 4 wherein said fairing seals are mounted on flat inner surfaces of said side beams.

6. A thrust reverser according to claim 5 wherein said side beams include recesses disposed forward of respective fairings for mounting said fairings substantially flush therein, and recessing said fairing seals below said fairings.

7. A thrust reverser according to claim 5 wherein:

each of said doors includes an inside forward perimeter disposed forward of said fairings, and an outside aft perimeter disposed aft of said fairings;

said duct further includes a forward seal surrounding each of said portals forward of said fairings for sealing said door forward perimeter when stowed; and said duct further includes an aft seal surrounding each of said portals aft of said fairings for sealing said door aft perimeter when stowed.

8. A thrust reverser according to claim 7 wherein said forward and aft seals adjoin opposite ends of said fairing seals to provide full perimeter sealing of said doors when stowed.

9. A thrust reverser according to claim 5 further comprising two pairs of actuator links pivotally joined at opposite ends to respective ones of said doors forward of said pivots thereof, and to said actuators for selectively rotating open and closed said doors around said pivots.

10. A thrust reverser according to claim 9 further comprising:

a pair of outer hooks fixedly mounted to each of said doors at forward ends thereof; and a plurality of inner latches joined to said side beams for selectively latching said outer hooks to prevent deployment of said doors.

11. A thrust reverser according to claim 5 wherein said exhaust nozzle has a coplanar trailing edge.

12. A thrust reverser according to claim 11 wherein said nozzle is annular at said trailing edge thereof, and blends forward therefrom with said flat inner surfaces of said side beams at said blister fairings.

13. A thrust reverser according to claim 12 wherein said blister fairings blend from said flat inner surfaces of said side beams to arcuate inner surfaces of said doors at said proximal borders of said fairings.

14. A thrust reverser according to claim 13 wherein each of said pivots comprises:

an inner support arm fixedly joined to a respective side beam;

an outer support arm fixedly joined to a respective door; and a fastener pivotally joining together respective pairs of said inner and outer arms; and each of said blister fairings is sized and configured to cover respective ones of said pivots.

15. An aircraft engine thrust reverser comprising:

an exhaust duct having an inlet and outlet nozzle at opposite ends, a pair of side beams extending therebetween, and a pair of diametrically opposite portals disposed forward of said nozzle;

a pair of thrust reverser doors disposed in said portals and rotatably mounted to said side beams at corresponding pivots;

means for selectively deploying open and retracting closed said doors around said pivots; and means including a plurality of blister fairings covering said pivots for sealing closed each of said doors around said portals.

16. A thrust reverser according to claim 15 wherein:

said exhaust nozzle has a coplanar circular trailing edge;

said side beams have flat inner surfaces blending to said circular nozzle trailing edge;

said blister fairings are fixedly joined to said doors for pivotal movement therewith; and said sealing means further include an arcuate fairing seal fixedly joined to said side beam in sliding sealing abutment with respective ones of said fairings.

17. A thrust reverser according to claim 16 wherein each of said fairings includes a proximal border fixedly joined to a respective door, and an arcuate distal border overlapping a respective beam concentrically with said arcuate fairing seal, and having a center of curvature corresponding with a respective pivot for rotation thereabout.

18. A thrust reverser according to claim 17 wherein:

each of said doors includes an inside forward perimeter disposed forward of said fairings, and an outside aft perimeter disposed aft of said fairings;

said sealing means further include a forward seal surrounding each of said portals forward of said fairings for sealing said door forward perimeter when stowed; and said sealing means further include an aft seal surrounding each of said portals aft of said fairings for sealing said door aft perimeter when stowed.

19. A thrust reverser according to claim 18 wherein said forward and aft seals adjoin opposite ends of said fairing seals to provide full perimeter sealing of said doors when stowed.

20. A thrust reverser according to claim 19 further comprising means for selectively latching closed said doors, and unlatching said doors only after said doors are overstowed.

21. An aircraft engine thrust reverser comprising:

an exhaust duct having an inlet and outlet nozzle at opposite ends, a pair of side beams extending therebetween, and a pair of diametrically opposite portals disposed forward of said nozzle;

a pair of thrust reverser doors disposed in said portals and rotatably mounted to said side beams at corresponding pivots;

means mounted on said side beams for selectively deploying open and stowing closed said doors around said pivots;

means for sealing closed each of said doors around said portals; and means for selectively latching closed said doors, and unlatching said doors only after said doors are overstowed.

22. A thrust reverser according to claim 21 wherein:

said exhaust nozzle has a coplanar trailing edge;

said side beams have inner surfaces blending to said nozzle trailing edge; and said sealing means include a plurality of blister fairings sealingly joined between said side beam inner surfaces and doors at respective ones of said pivots.

23. A thrust reverser according to claim 22 wherein:

said blister fairings are fixedly joined to said doors for pivotal movement therewith; and said sealing means further include an arcuate fairing seal fixedly joined to said side beam in sliding sealing abutment with respective ones of said fairings.

24. A thrust reverser according to claim 23 wherein each of said fairings includes a proximal border fixedly joined to a respective door, and an arcuate distal border overlapping a respective beam concentrically with said arcuate fairing seal, and having a center of curvature corresponding with a respective pivot for rotation thereabout.

25. A thrust reverser according to claim 24 wherein:

each of said doors includes an inside forward perimeter disposed forward of said fairings, and an outside aft perimeter disposed aft of said fairings;

said sealing means further include a forward seal surrounding each of said portals forward of said fairings for sealing said door forward perimeter when stowed; and said sealing means further include an aft seal surrounding each of said portals aft of said fairings for sealing said door aft perimeter when stowed.

26. A thrust reverser according to claim 25 wherein said forward and aft seals adjoin opposite ends of said fairing seals to provide full perimeter sealing of said doors when stowed.

27. A thrust reverser according to claim 26 wherein said nozzle trailing edge is circular, and said side beam inner surfaces are flat along said fairing proximal borders.

* * * * *